June 29, 1971  R. A. BELLINGHAM ETAL  3,588,977
INSERT GEOMETRY
Filed Aug. 6, 1968  2 Sheets-Sheet 1
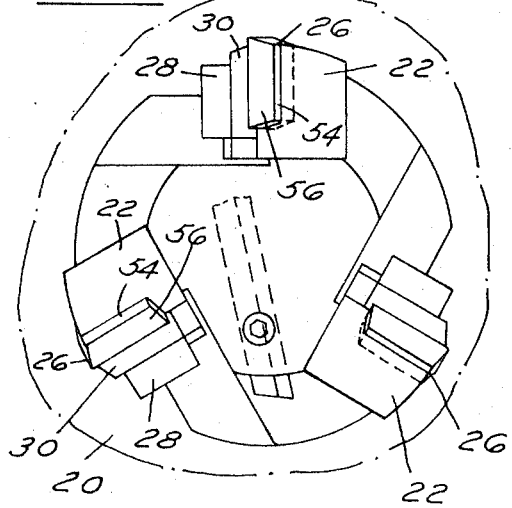
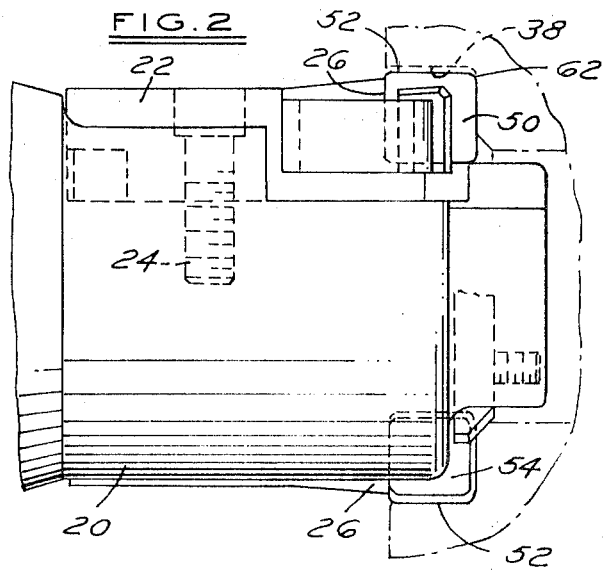
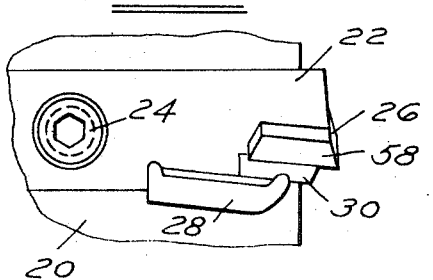
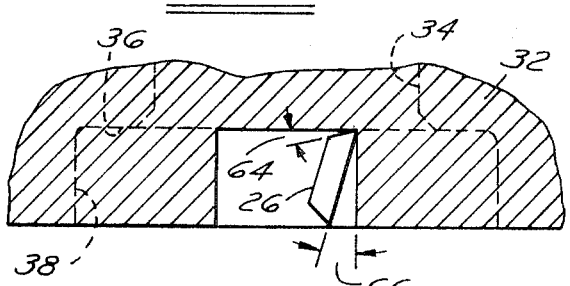
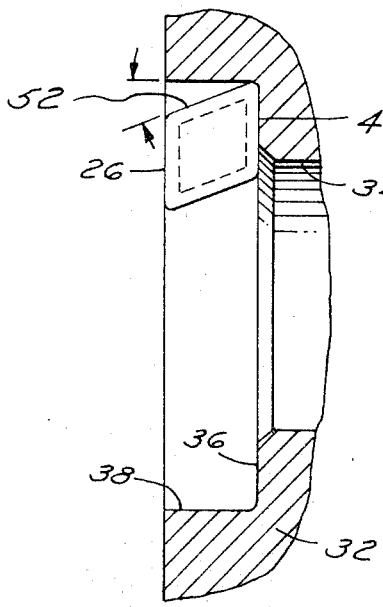
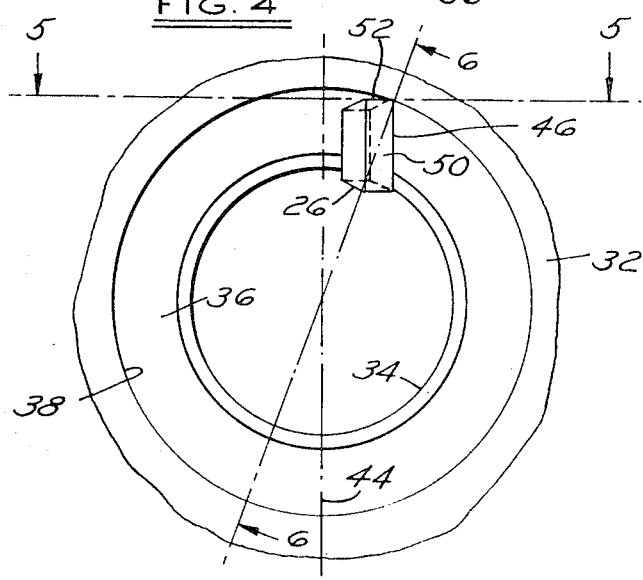
INVENTORS
ROBERT A. BELLINGHAM
VICTOR MILEWSKI
BY
Farley, Forster & Farley
ATTORNEYS

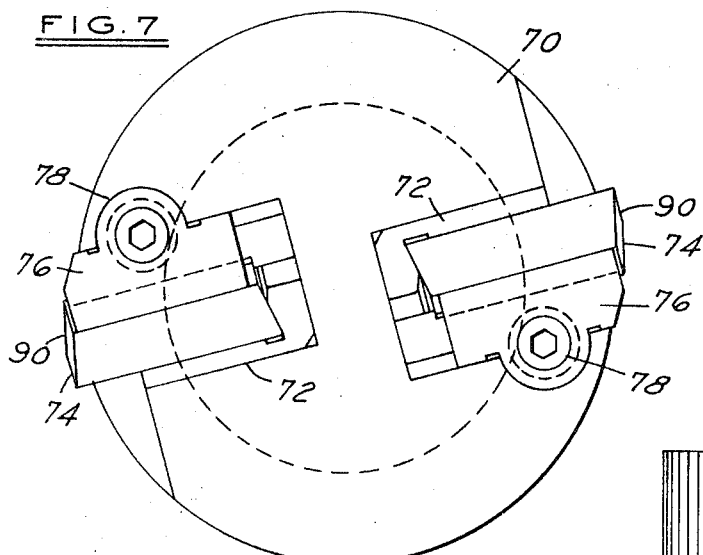
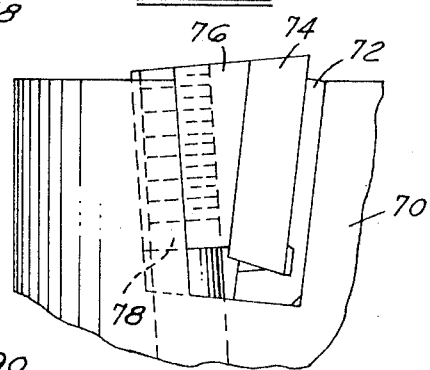
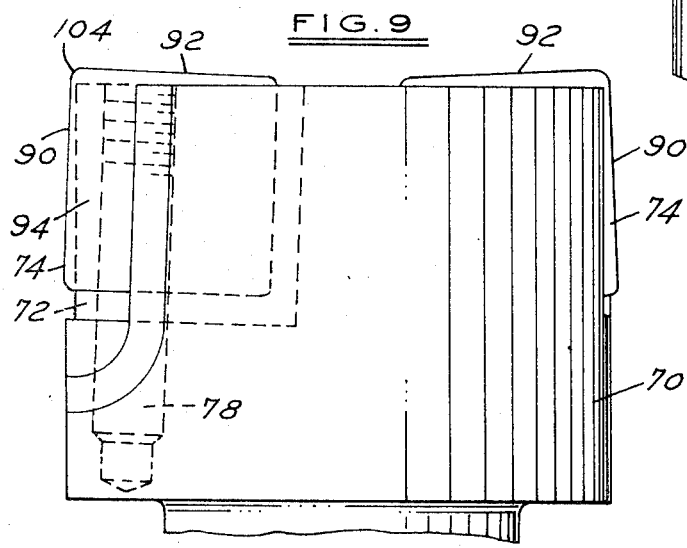
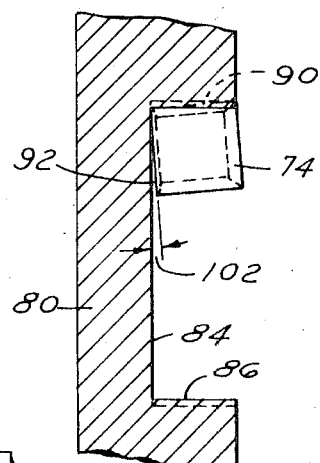
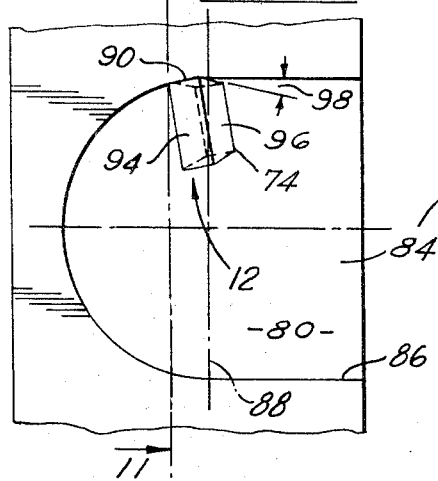
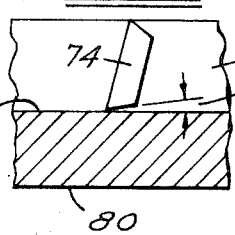

United States Patent Office 3,588,977
Patented June 29, 1971

3,588,977
INSERT GEOMETRY
Robert A. Bellingham, Southfield, and Victor Milewski, Birmingham, Mich., assignors to The Valeron Corporation
Filed Aug. 6, 1968, Ser. No. 750,616
Int. Cl. B23d 1/12
U.S. Cl. 29—105                                    6 Claims

ABSTRACT OF THE DISCLOSURE

The means and method of using a square cutting insert to bore, mill and turn 90° shoulder walls, while having necessary side clearance, by providing the insert with zero lead, negative radial rake, and positive axial rake.

BACKGROUND OF THE INVENTION

Cutting tools with indexable cutting inserts and which are used to bore or mill a 90° shoulder wall, or to turn a square shoulder, customarily use positive rake inserts which are either diamond or triangular in shape. They have only two or three cutting edges but have been considered to be the only shape of insert which will allow cutting a square shoulder within an enclosing wall while providing necessary side clearance.

Under standard practice, when a square insert is used to bore or turn an enclosed end wall, and has its cutting edge disposed on the tool or work centerline, or advanced just enough ahead to avoid tool chatter, it cannot be provided with axial rake without having its back upper and outer disposed corner drag on the side wall. In milling, or turning an inner annular side wall, it cannot be provided with radial rake without having its lower disposed inner corner drag on the end wall, and if it is dished for end wall clearance the cutting edge is caused to cross the plane of revolution necessary to cut a square shoulder wall.

As a consequence, in cutting an enclosed 90° shoulder, it has always been assumed necessary to use an insert with an included angle of less than 90° between its cutting edge and the next adjacent shoulder wall.

SUMMARY OF THE INVENTION

This invention relates to the use of square cutting inserts to cut square shoulders within an enclosing side wall and more particularly to a geometrical arrangement of the insert which makes this possible.

In boring tools, a square insert is provided with zero lead and negative radial rake by having its cutting edge located in parallel spaced relation ahead of the radial centerline of the tool, more than merely to stop tool chatter, and sufficiently to permit axial rake providing for side wall clearance. A projection of the cutting and side wall edges of the insert on an axial plane through the cutting corner of the insert will show that the included angle at the cutting corner is less than 90° and, consequently, a square shoulder wall can be cut.

For milling, the square insert has its end wall edge similarly located ahead of the radial center line of the tool, and is provided with back rake, which in this instance is axial. But, the side wall cutting edge is provided zero lead by being placed square with the plane of revolution to cut a square shoulder side wall, and this lifts and pulls back the lower inner corner to provide radial rake and end wall clearance. As before, a projection of the cutting and work wall edges of the insert on an axial plane through the cutting corner shows the effective included angle to be less than 90° as necessary for forming a square shoulder wall.

To turn an inner end or enclosing side wall, and provide a square shoulder, using a square insert, the geometry for the insert is the same as for boring or milling, respectively.

In actual practice, the cutting edge of the square insert is provided zero lead relative to the shoulder wall to be cut, and is given negative radial and positive axial rake. In boring, or turning an end wall, the cutting edge is located ahead of the tool or work centerline a distance greater than the sine of the axial rake angle times the side edge dimension of the insert, divided by two, to avoid back wall interference. In milling, the advanced positioning of the end wall edge of the insert should be equal to the sine of the axial rake angle times the side edge dimension divided by two, to be assured that the opposite cutting edge corners of the insert are on the side wall plane being cut.

DESCRIPTION OF THE DRAWINGS

FIG. 1 is an end view of a boring tool cutter;
FIG. 2 is a side elevation of the boring tool of FIG. 1 partially rotated to more clearly show both front and back side views of the cutting insert;
FIG. 3 is a top plan view of a cutter cartridge holder of the boring tool of the previous drawing figures;
FIG. 4 is a diagrammatic view looking into a bore hole and showing the positioning of a square insert ahead of the radial centerline, exaggerated for clarity, in the practice of the present invention;
FIG. 5 is a cross sectional view taken along the line 5—5 of FIG. 4;
FIG. 6 is a cross sectional view taken in the axial plane of line 6—6 of FIG. 4, through the bore hole and showing a projection of the insert on the bisecting plane;
FIG. 7 is an end view of a milling tool cutter;
FIG. 8 is a side elevation of a fragmentary part of the milling cutter of the last mentioned drawing figure showing the wedge lock insert retaining means;
FIG. 9 is a side elevation of the milling tool of FIG. 7;
FIG. 10 is a diagrammatic view looking down into a milling tool slot and showing the positioning of a square insert in the practice of the present invention;
FIG. 11 is a cross sectional view taken in the plane of line 11—11 in FIG. 10 through the milling slot and showing the disposition of the insert therein;
FIG. 12 is an end view of the insert in the milling cut of FIG. 10 looking in the direction of arrow 12.

DETAILED DESCRIPTION OF THE INVENTION

A boring tool 20 is shown in FIGS. 1–3 with insert cartridges 22 retained in receptive slots on its outer periphery by screw thread fasteners 24. Each cartridge has a square shaped cutting insert 26 held by a clamp 28 (secured by a screw fastener omitted from the view) bearing on a chip breaker 30 next to its cutting edge face. Shim seats are not shown under the inserts, although normally used, and the cartridge parts are shown principally in outline form, rather than all details, to avoid confusion in depicting the relative orientation of the cutting inserts for their intended purpose of cutting square shoulder walls in a bore hole.

In FIGS. 4–6 a workpiece 32 is shown within a bore hole 34 and a square positive rake cutting insert 26 is shown as it is oriented in the boring tool 20 and is used to provide a counterbore by cutting a square shoulder end wall 36 without dragging on the encircling side wall 38. Because of the unobstructed and clearer view of the cutting insert in these drawing figures, the invention as used in a boring tool will be understood best by giving these views closest attention in the discussion which follows.

Each insert 26 is provided with negative radial rake by having its end wall cutting edge 46 located in parallel spaced relation ahead of the radial center line 44 of the tool, and bore, and is provided with positive axial rake so that its front face wall 50 is inclined rearwardly. This causes the side wall edge 52 of the insert to lie within the chordal segment related to the cutting corner of the insert, leaving the side wall 38 of the shoulder wall being formed, and providing the necessary side wall clearance axially back of the cutting corner.

In FIG. 1, the axial rake angle provided the inserts 26 causes their back wall 54 and end wall side edge 56 over the tool holder body to be shown, while in FIG. 3 their radial rake causes only the side wall side 58 of the insert to be visible. In FIG. 2, the side shoulder wall 38 of the workpiece, shown in phantom outline, is spaced from the side wall edge 52 of the insert because of the rake angles which dispose the cutting corner 62 of the insert in the shoulder wall corner forwardly of the radial center line of the tool and bore, as regards the insert having its face wall 50 towards the viewer, and rearwardly thereof as regards the insert seen from its back side 54.

FIG. 5 shows the end wall clearance 64 provided by the side wall relief of the positive rake insert and also the amount of axial rake given the insert, which is designated 66.

FIG. 6 shows a projection of the four indexable cutting edges of the inserts 26 on a radial plane through the cutting corner of the insert and best shows how a square insert can serve equally as well as a diamond or triangular shaped insert in cutting a 90° shoulder wall. By having the inner disposed corner of the cutting edge 46 extending relatively forward of the radial plane, and the upper corner of the side wall edge 52 extending behind it, the relative relation between the cutting and side wall edges of the insert provides an included angle of less than 90° and simulates an insert of the shape shown but which is indexable for use of all four cutting edges.

In actual practice, the cutting edge of the insert should be located in parallel spaced relation ahead of the radial centerline of the tool an amount greater than the sine of the axial positive rake angle times the side edge dimension of the insert, divided by two, to assure that the side wall edge of the insert, as it is dropped back in providing axial rake does not come into contact with the encircling wall behind the insert.

Referring now to FIGS. 7–12, the same general principle will be shown as used to enable milling a square shoulder wall with square shaped cutting insert.

In FIGS. 7–9, a milling cutter tool 70 is shown, with peripheral slots in one end receptive of anvil seats 72 for square inserts 74 that are held in the pockets of the anvils by wedges 76 actuated by screw thread fasteners 78. The drawing FIGS. 10–12 show a work part 80 with a milled slot including a bottom or end wall face 84, a side shoulder wall 86, including an encircling part at the working end thereof, and one of the inserts 74 as oriented in the milling cutter tool 70 and used to provide a square shoulder cut.

Each insert 74 is disposed ahead of the radial centerline 88 of the tool, which is the same as for the encircling side wall 86 being cut, and is provided with positive axial rake the same as for boring with a square insert. However, since the side wall is being cut, instead of the end wall, the insert is given zero lead by having the side wall cutting edge 90 of the insert placed on the plane of the side shoulder wall to be formed. In so doing, the end wall edge 92 of the insert is divergently lifted off the end wall face 84 of the work, and end wall clearance is provided.

In FIG. 7, the side wall cutting edge 90 of the inserts is seen to be a relatively short chordal line which will be appreciated as having opposite ends spaced a like distance from the axial centerline of the tool. The infinitesimal amount that the intermediate part of the cutting edge is spaced inwardly thereof is of no consequence, and the larger the diameter of the milling cut and the less the rake angle necessary for end clearance, the more insignificant this is.

FIG. 10 shows the front face 94 and top side wall edge 96 of the insert 74 with its side wall cutting edge 90 on the side shoulder wall 86. The side wall relief provided for the positive rake insert is designated 98 and shows ample clearance behind the cutting edge. In FIG. 12 the relief clearance at the cutting corner of the insert is shown and identified as 100. FIG. 11 shows the end wall clearance 102 provided by the axial rake and side wall engagement of the insert, and also illustrates how the side wall cutting edge 90 lays back along the receding side shoulder wall being formed.

Reference is best made to FIG. 9 in showing how the square insert serves equally as well as a diamond or triangular shaped insert in cutting a 90° shoulder wall. In this side elevational view, the insert 74 on the left is seen from the front face 94 with the upper corner 104 leaning forward in cutting the encircling side wall and the other corner of the insert 90, trailing therebehind. The inner corner of the end wall edge 92 also lays back behind the upper corner 104 and consequently the projection of the end wall edge relative to the cutting plane of the side wall cutting edge, as seen on the right, shows an included angle of less than 90° and simulates the shape of insert always used, but enables using a square insert with four indexable cutting edges.

From the foregoing discussion of boring and milling cutter tools, it will be appreciated that square inserts can also be used to turn a square shoulder within an encircling side wall. In cutting an end wall, the insert is held with its end wall cutting edge ahead of the radial centerline of the work and raked back for side wall clearance. In cutting a side wall, the cutting corner leads the radial centerline of the work, back rake is provided, and the side wall cutting edge is placed in the plane of the shoulder wall to be cut.

Within the teachings of the present invention, square shaped inserts can be used to cut 90° shoulder walls within an enclosing or encircling annular wall as easily and simply as for cutting outer peripheral shoulder walls where the work wall being cut recedes from the side or end wall edge of the cutting insert. By locating the shoulder wall forming corner of the insert forward of the radial centerline of the tool, or work, and providing axial rake, the side edge of the insert can be made to recede from the side wall for side clearance, or the end wall of the insert may be lifted and made to recede from the end wall of the shoulder being formed to provide whatever end clearance is desired.

While preferred embodiments have been described above in detail, it will be understood that numerous modifications might be resorted to without departing from the scope of the invention as defined in the following claims.

What is claimed is:

1. The method of using indexable square cutting edge inserts to machine substantially right angle shoulder walls in boring, milling or like machining operations involving relative rotational and linear feed movement between workpiece and cutting insert, including means to provide cutting edge relief during machining relative to the workpiece shoulder extending parallel to the direction of feed, comprising the mounting of said insert with side relief angles for each of the four cutting edges on a tool holder with the corners of the insert adjacent the shoulder apex cutting corner positioned respectively on opposite sides an axial plane passing through said cutting corner, the positioning of one cutting edge having at least cutting extremities in one of the substantially right angle surfaces generated by the combined rotational and linear feed movement, and the provision of relative linear feeding between said holder and workpiece in a direction substantially parallel to the other of said substantially right angle surfaces during said relative rotation.

2. The method of claim 1 used for boring operations wherein said last named cutting edge is positioned in a plane extending normal to the direction of linear feed movement and rotational axis.

3. The method of claim 1 used for milling operations having a feed normal to the rotational axis wherein said cutting extremities are positioned in the shoulder surface extending parallel to the rotational axis.

4. A tool holder comprising a holder body, a seat in said body adapted to locate an indexable square cutting edge insert with the corners of the insert adjacent the shoulder apex cutting corner positioned respectively on opposite sides of a plane passing through said cutting corner and including the rotational axis when in operating relationship with a workpiece, and with one cutting edge having at least cutting extremities positioned in one of the right angle surfaces generated in the workpiece by the combined rotational and linear feed movement, and means for clamping said insert in any of its indexable positions.

5. A boring tool holder as set forth in claim 4 wherein said last named cutting edge is positioned in a plane extending normal to the direction of linear feed movement and rotational axis when said boring tool is in operating relationship relative to a workpiece.

6. A milling tool holder as set forth in claim 4 wherein said cutting extremities are positioned in the shoulder surface extending parallel to the rotational axis when said milling tool is in operating relationship relative to a workpiece with a feed normal to the rotational axis.

References Cited
UNITED STATES PATENTS

| | | | |
|---|---|---|---|
| 3,091,138 | 5/1963 | Berry | 77—58 |
| 3,104,453 | 9/1963 | Greenleaf | 29—105 |
| 3,125,799 | 3/1964 | Bennett | 29—105 |
| 3,217,385 | 11/1965 | Grueninger | 29—105 |
| 3,229,350 | 1/1966 | Yogus | 29—105 |
| 3,250,154 | 5/1966 | Breuning | 77—58 |
| 3,345,721 | 10/1967 | Garih | 29—105 |

HARRISON L. HINSON, Primary Examiner

U.S. Cl. X.R.

77—58